United States Patent
Tanida

(10) Patent No.: US 6,890,665 B1
(45) Date of Patent: May 10, 2005

(54) MARTENSITIC STAINLESS STEEL AND METHOD FOR MANUFACTURING THE SAME

(75) Inventor: Mutsumi Tanida, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 58 days.

(21) Appl. No.: 10/670,277

(22) Filed: Sep. 26, 2003

Related U.S. Application Data

(63) Continuation of application No. PCT/JP03/01194, filed on Feb. 5, 2003.

(30) Foreign Application Priority Data

Feb. 6, 2002 (JP) ........................................ 2002-029067

(51) Int. Cl.$^7$ ............................. B32B 15/04; C21D 6/00
(52) U.S. Cl. ..................... 428/469; 29/81.01; 29/81.06; 29/81.08; 148/246; 148/286; 148/516; 148/519; 148/537; 148/592; 148/660; 148/662; 148/663; 428/141; 428/155; 428/212; 428/336; 428/409; 428/472; 428/926
(58) Field of Search ................................ 428/469, 141, 428/155, 212, 336, 409, 472, 926; 148/246, 286, 516, 519, 537, 592, 660, 662, 663; 29/81.01, 81.06, 81.08

(56) References Cited

U.S. PATENT DOCUMENTS

| 5,520,751 A | 5/1996 | Pareek et al. ............... 148/286 |
| 6,210,806 B1 * | 4/2001 | Hidaka et al. .............. 428/469 |

FOREIGN PATENT DOCUMENTS

| EP | 63-238217 | 10/1988 |
| EP | 937782 | 8/1999 |
| EP | 1008666 | 6/2000 |
| EP | 1099772 | 5/2001 |
| JP | 9-143629 | 6/1997 |
| JP | 11-302802 | 11/1999 |

* cited by examiner

Primary Examiner—Robert R. Koehler
(74) Attorney, Agent, or Firm—Clark & Brody

(57) ABSTRACT

Martensitic stainless steel whose steel composition is restricted within a specific range for each element is provided. The scale layer formed on the surface of the base material consists of an inner layer scale mainly including $FeCr_2O_4$ and an outer layer scale having a thickness of not more than 20 μm, which outer layer is deposited on the inner layer scale at a surface coverage of not less than 1% and not more than 15%. The application of rust preventive oil onto the surface of the steel ensures an excellent weather resistance during a long term, and therefore a martensitic stainless steel forming no rust either in the outdoor depository or in the indoor depository can be provided. The steel can be used to manufacture, not only steel pipes, but also steel plates, steel rods and others in a wide application field.

5 Claims, 2 Drawing Sheets

MARTENSITIC STAINLESS STEEL AND METHOD FOR MANUFACTURING THE SAME

This application is a continuation of International patent application. No. PCT/JP03/01194 filed Feb. 5, 2003. This PCT application was in English as published under PCT Article 21(2).

TECHNICAL FIELD

The present invention relates to a martensitic stainless steel and a method for manufacturing the martensitic stainless steel, and more specifically to a martensitic stainless steel which is capable of being used in a structure or construction requiring a high weather resistance and which is capable of preventing rust from forming, when it is stored either in an outdoor depository or in an indoor depository, and also to a method for manufacturing such a martensitic stainless steel.

BACKGROUND ART

Generally, a stainless steel including Cr in a content of 12 to 15% in steel is generally referred to as 13% Cr steel. Such 13% Cr steel is excellent regarding the mechanical properties, such as the yield strength, the yield stress and the like, as well as regarding the heat resistance, so that the steel may be used, for instance, as a material for an oil well pipe.

In the process of manufacturing 13% Cr steel, a steel material is normally heat-treated at a high temperature and quenched, so that a scale layer having a double layer structure consisting of an inner layer scale and an outer layer scale are inevitably formed on the surfaces of the 13% Cr steel. The inner layer scale includes mainly the spinel type $FeCr_2O_4$ having a high weather resistance, FeO, $Fe_3O_4$, $Fe_2SiO_4$ and the like, and it has an excellent adhesivensess to the surface of the base material of the 13% Cr steel, whereas the outer layer scale includes $Fe_2O_3$, $Fe_3O_4$ and the like and it has a less adhesiveness.

Before shiping the 13% Cr steel, descaling was compulsively carried out by applying a treatment such as the acid pickling or the shot blast to the surface having the scale layer formed. In recent years, however, 13% Cr steel is increasingly shipped without any application of descaling process to the surface thereof in order to reduce both the number of processes and the production cost.

On the other hand, a high weather resistance is required for the 13% Cr steel and, therefore, rust preventive oil is conventionally applied to the surfaces of the steel. When, however, the 13% Cr steel having scales is shipped after applying such a rust preventive oil to the surface thereof, only the outer layer scale having less adhesion peels off, thereby causing the rust preventive oil to be removed from the surface, together with the outer layer scale. As a result, no sufficient weather resistance can be obtained.

Various methods for manufacturing such 13% Cr steel were investigated in order to obtain an excellent weather resistance.

It is well known that the state of the steel surface plays an essential role for enhancing the weather resistance. In order to improve the surface state of the 13% Cr steel, a method has been demonstrated wherein the base material is heated under an oxygen-free atmosphere and then quenched. It is also well known that the main components of the scale layer formed on the surface of the steel are iron oxides, and neither the 13% Cr steel is oxidized nor the scale layer is formed in the manufacturing method under such an oxidation-free atmosphere.

Since, therefore, no outer layer scale peels off, the application of the rust preventive oil to the steel surface provides a sufficient high weather resistance. In this method, however, an additional apparatus for producing the oxygen-free atmosphere is required. This causes both the installation cost and the running cost to be increased, and eventually the cost of manufacturing the 13% Cr steel is increased.

In another method for enhancing the weather resistance, the heating temperature is decreased in the quenching process. This method provides a decreased amount of the scales formed on the steel surface. However, there is no substantial improvement regarding the formation of the scale layer itself. As a result, this method also provides a similar problem in which the outer layer scale peels off in the shipment and the rust preventive oil applied to the steel surface is also removed, together with the outer layer scale.

On the other hand, it is assumed that, in order to prevent the outer layer scale from peeling off, the outer layer scale should be preferably removed beforehand. From this viewpoint, Japanese Patent Application Laid-open (Kokai) No. 11-302802 has proposed a method for manufacturing a martensitic stainless steel, wherein, after descaling, the quenching treatment and the tempering treatment are sequentially carried out. Japanese Patent Application Laid-open (Kokai) No. 11-302802 has further disclosed a method for manufacturing a martensitic stainless steel, wherein, after the quenching treatment, the descaling and the tempering treatments are sequentially carried out.

The martensitic stainless steel manufactured with anyone of these methods provides an excellent weather resistance, since the outer layer scale, which is apt to peel off, is completely removed. Nevertheless, an outer scale is again formed in the final process of tempering. Accordingly, in order to obtain a martensitic stainless steel having a high weather resistance, it is important to properly specify how the scale formed in the final process of tempering is treated.

DISCLOSURE OF INVENTION

In view of the above-mentioned problems, it is an object of the present invention to provide a martensitic stainless steel having an inner layer scale having a main component of $FeCr_2O_4$ and an outer layer scale, which is unable to peel off, thereby enabling its weather resistance to be enhanced.

The present inventor investigated the properties of a scale layer consisting of an inner layer scale and an outer layer scale. As described above, the inner layer scale has high weather resistance and an excellent adhesiveness to the base material, whereas the outer layer scale has less adhesion, and therefore provides a reduction in the weather resistance. From these facts, it follows that removing the outer layer scale beforehand provides the exposure of the inner layer scale to the outside of the steel, so that the weather resistance of the steel itself is improved.

However, although the outer layer has less adhesion, it is still difficult to remove the outer layer with ease, and when the working efficiency is taken into account, it is extremely difficult to completely remove only the outer scale. Accordingly, it will be effective that the outer layer scale is removed in such a mount that the removal substantially provides no influence on the weather resistance of the finished steel.

Meanwhile it is noted that very fine cracks always appear over the entire surface of the inner layer scale after the outer layer scale is removed. The amount of the cracks is quite small, i.e., not more than 2.0% in the area percentage. Rust is formed in the cracks and further grows therefrom. In view of this fact, the formation of rust can be suppressed by appropriately utilizing these cracks and by further applying the rust preventive oil to the steel surfaces.

In the permeation of the rust preventive oil into the cracks, each of the cracks acts as a kind of wedge to prevent the rust preventive oil from removing from the surface, thereby making it possible to permanently maintain the weather resistance of the base material in the steel.

A further experimental investigation was made as for the method of manufacturing a martensitic stainless steel having such a scale layer. Since the final state of the scale layer decisively influences on the weather resistance of the steel, it is necessary to form a desired scale layer in the descaling treatment during the tempering process.

For this purpose, firstly, the surfaces of the steel are reconstructed in the same state of the original base material by removing the scale layers formed in the quench treatment. Thereafter, the steel is tempered and then descaled such that a desired finished scale layer can be obtained from the scale layer formed in the tempering treatment.

This procedure provides a decreased thickness in the scale layer and therefore the descaling after the tempering can easily be carried out. Since, moreover, there is no coexistence of the scale layer formed in the heating of the quenching treatment and the scale layer formed in the tempering treatment, a desired finished scale layer can stably be obtained.

In accordance with the present invention, (1) a martensitic stainless steel and (2) a method for manufacturing a martensitic stainless steel are developed as follows, based on the above-mentioned knowledge:

(1) A martensitic stainless steel comprising in mass % C: 0.15–0.22%, Si: 0.18–1.0%, Mn: 0.05–1.0%, Cr: 10.5–14.0% and Fe as substantial residual, and further including Ni: not more than 0.20%, Al: not more than 0.05%, N: not more than 0.100%, S: not more than 0.015% and P: not more than 0.020% as impurities, wherein a scale layer on the surface of the base material consists of an inner layer scale including mainly $FeCr_2O_4$ and an outer layer scale having a thickness of not more than 20 μm deposited on the surface of the inner layer scale at a surface coverage of not less than 1% and not more 15%, and wherein rust preventive oil is applied to the surface of said scale layer.

(2) A method for manufacturing a martensitic stainless steel, comprising the steps of: heating a base material comprising in mass % C: 0.15–0.22%, Si: 0.18–1.0%, Mn: 0.05–1.0%, Cr: 10.5–14.0% and Fe as substantial residual, and further including Ni: not more than 0.20%, Al: not more than 0.05%, N: not more than 0.100%, S: not more than 0.015% and P: not more than 0.020% as impurities in a quenching furnace at 850–980° C.; completely descaling a scale layer formed on the surface of the base material; quenching the base material; tempering the base material in a tempering furnace; partially descaling a scale layer newly formed on the surface of the base material to form a finished scale layer consisting of an inner layer scale including mainly $FeCr_2O_4$ and an outer layer scale having a thickness of not more than 20 μm deposited on the surface of the inner layer scale at a surface coverage of not less than 1% and not more 15%; and applying rust preventive oil.

In the method for manufacturing a martensitic stainless steel, the descaling after heating in the quenching furnace is carried out at a collision pressure of not less than 473 $N/mm^2$, using a high-pressure water descaler, and the descaling after the tempering is carried out at a collision pressure of 167–343 $N/mm^2$, using a high-pressure water descaler.

BEST MODE FOR CARRYING OUT THE INVENTION

Figure 1:
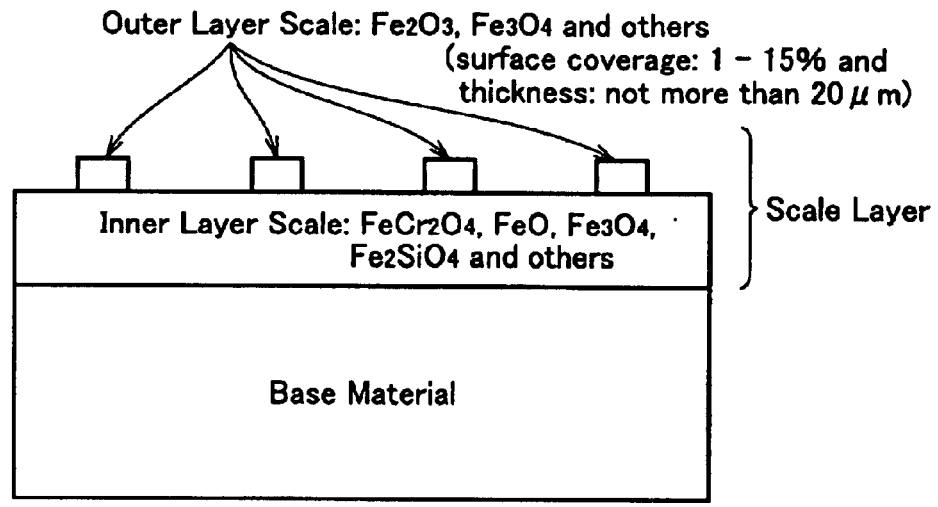
FIG. 1 is a sectional view of a martensitic stainless steel according to the present invention, wherein a scale layer is formed on the surface thereof.

In the following description, the martensitic stainless steel according to the present invention is used for a steel pipe. However, the shape is not restricted to such a pipe. The martensitic stainless steel according to the present invention can be used in the form of a plate, a rod or the other shape.

The present invention will be described in detail with regard to (1) chemical composition of steel (base material), (2) structure of the scale layer and (3) the quenching and tempering treatments.

(1) Chemical Composition of Steel (Base Material)

The steel includes C, Si, Mn and Cr as indispensable elements, and further Ni and the other elements as impurities. In the following, the reasons why the specified element is selected and why the specified content is determined in the chemical composition are described. The % representation in the following description regarding the chemical composition implies the mass %.

C: 0.15–0.22%

C is an element for enhancing the mechanical strength. A C content of not less than 0.15% is required to obtain a mechanical strength of 80 ksi (551.58 MPa). However, an excessive C content provides a reduction in the corrosion resistance. Accordingly, the C content is to be set not more than 0.22%.

Si: 0.18–1.0%

Si is an element as a deoxidizer necessary for reducing oxygen, which deteriorates the hot workability in the process of manufacturing the steel. Furthermore, Si suppresses the formation of scales and increases the adhesiveness of the scale to the base material. In order to obtain such effect, it is necessary to set the content of Si not less than 0.18%. However, an excessive content of Si provides a reduction in the toughness. Accordingly, the Si content is to be set not more than 1.0%.

Mn: 0.05–1.0%

Mn is an element as a deoxidizer, similarly to Si. Furthermore, Mn enhances the hot workability by immobilizing solid solution S solved in the steel as MnS. In order to obtain such effect, it is necessary to set the content of Mn not less than 0.05%. However, an excessive content of Mn provides a reduction in the toughness and further forms $FeO.Mn_2O_3$ spinel type oxides in the inner layer scale, thereby causing marked brittleness and exfoliation to be provided for the inner layer scale. Accordingly, the Mn content is to be set not more than 1.0%. In order to further obtain enhanced toughness, the Ma content should be preferably set not more than 0.85%.

Cr: 10.5–14.0%

Cr is an element for enhancing the corrosion resistance, in particular the $CO_2$ corrosion resistance. In order to suppress the pitting corrosion and/or the crack corrosion, it is necessary to set the content of Cr not less than 10.5%. On the other hand, Cr is an element for forming ferrite. A Cr content of more than 14.0% causes δ ferrite particles to be formed in the heat treatment at a high temperature, so that the hot workability is deteriorated. In addition, a greater amount of ferrite makes it impossible to obtain a desired mechanical strength, even if the tempering treatment for maintaining the stress corrosion crack resistance is carried out. Accordingly, the Cr content is to be set not more than 14.0%.

Ni: Not more than 0.20%

Ni induces the stress corrosion crack under hydrogen sulfide atmosphere, and therefore the Ni content is to be set not more than 0.20%. On the other hand, Ni has an effect to enhance the adhesiveness between the base material and the inner layer scale. Accordingly, the Ni content should be set preferably not less than 0.02%.

Al: Not more than 0.05%

Al is an element of deteriorating the index of cleanliness of steel. Moreover, Al causes a nozzle to be stopped when a base material is produced in the continuous casting. Therefore, it is necessary to set the Al content not more than 0.05%. On the other hand, Al is effective for deoxidization, so that the Al content should be preferably not less than 0.0005%.

N: Not more than 0.100%

N is an element of reducing the toughness at an excessive content, and therefore the N content is to be set not more than 0.100%. On the other hand, N has an effect to improve the mechanical strength by the solid solution strengthening, so that the N content should be preferably not less than 0.010%.

S: Not more than 0.015%

S is an impurity element included in steel and an excessive content causes the hot workability to be greatly reduced. Such effect is prominent, when a steel pipe is manufactured with a plug mill or a mandrel mill, or when a steel billet is pierced with a piercing mill. The steel pipe cannot be produced without defects at a greater S content. Accordingly, the S content is to be set not more than 0.015%.

P: Not more than 0.020%

P is an impurity element similar to S, and an excessive content of P in steel makes it impossible to prevent defects from being formed. Moreover, the toughness is also greatly reduced at such a P content. Accordingly, the P content is to be set preferably not more than 0.020%.

(2) Structure of the Scale Layer

In the martensitic stainless steel according to the present invention, the surface of the base material is covered with a scale layer consisting of an inner layer scale and an outer layer scale, and rust preventive oil is further applied to the surface of the scale layer.

FIG. 1 is a sectional view of a martensitic stainless steel according to the present invention, wherein a scale layer is formed on the surface of the steel. The inner layer scale consists of mainly $FeCr_2O_4$, and further includes FeO, $Fe_3O4$, $Fe_2SiO_4$, and the like. $FeCr_2O_4$ provides an excellent weather resistance due to an increased magnitude of Cr concentration, and therefore the inner layer is not rusted even if it is exposed directly to the atmosphere.

The inner layer scale covers the entire surface of the base material and serves protecting the base material. Very fine cracks are inevitably produced in the inner layer scale, so that rust is formed at the cracks and grows therefrom. However, the rust can be suppressed by rust preventive oil, as will be later described.

On the other hand, the outer layer scale is formed on the surface of inner layer scale, and consists of $Fe_2O_3$, $Fe_3O_4$ and the like. The outer layer scale covers a 1% to 15% surface area of the inner surface scale, and the thickness of the outer layer scale is not more than 20 μm.

When the area ratio defined by the ratio of the areas covered by the outer layer scale to the entire surface area of the inner layer scale (hereinafter the area ratio is referred to as "surface coverage") is increased, the number or amount of the outer layer scale peeled off increases in the transportation. In conjunction with the exfoliation, a greater amount of rust preventive oil is also lost, thereby making it impossible to obtain a high weather resistance. If the surface coverage is zero, a high weather resistance can be obtained without exfoliation. In this case, however, it will take a long time to completely remove the outer layer scale, along with an increased number of steps in the manufacturing process.

As will be later described, the method for manufacturing a martensitic stainless steel is characterized in that the surface coverage is reduced by descaling the outer layer scale. Even in a decreased surface coverage, it is assumed that the remaining parts of the outer layer scale is less exfoliative ones, compared with those of the outer layer scale, which have already been removed. Such the remaining parts of the outer layer may provide no problem regarding the ease of exfoliation.

When the descaling is carried out down to a surface coverage of not more than 15%, there is no substantial problem regarding the weather resistance due to the exfoliation of the outer layer scale. On the other hand, the complete descaling is unavoidably limited in a certain degree on the basis of the productivity, the limitation as for both the duration required for the descaling process and the number of working steps, so that the surface coverage should be set preferably not less than 1%, and more preferably not less than 5%.

Moreover, an increased thickness of the outer layer scales provides an increase in the amount of their exfoliation, and accordingly the weather resistance is increasingly deteriorated. From this viewpoint, the thickness of the outer layer scale should be set not more than 20 μm.

In accordance with the present invention, rust preventive oil (not shown in FIG. 1) is applied the surface of the scale layer consisting of an inner layer scale and an outer layer scale. Although the rust preventive oil further enhances the weather resistance of the martensitic stainless steel itself, it mostly suppresses the formtion and growth of rust due to cracks generated in the inner layer scale after the rust preventive oil is permeated thereinto. Accordingly, it is preferable that the rust preventive oil has a high permeability and, therefore, plant oil, mineral oil or the like can be employed preferably as rust preventive oil.

(3) Quenching and Tempering Treatments

In the method for manufacturing a martensitic stainless steel according to the present invention, the quenching and tempering treatments are applied. A base material before quenching is prepared from the steel material including the elements defined in (1) the chemical composition, and the manufacturing process is generally carried out with a conventional manufacturing method.

(a) Quenching

In the quenching treatment, a base material is heated in a quenching furnace, in which case, LNG, LOG, heavy oil, butane or the like can be used for producing the gas atmosphere in the quenching furnace. More specifically, the gas atmosphere comprises preferably $O_2$: 0.01–8.0%, $H_2O$: 3.0–20.0%, $CO_2$: 1.0–20.0%, $N_2$ and others: residual. If the quenching furnace is not filled with such a gas atmosphere, the unit consumption due to the imperfect combustion or an excessive amount of $O_2$ deteriorates, or it is necessary to feed additional gas or steam into the quenching furnace, and therefore, this causes the cost to be increased.

The base material is heated at 850–980° C. in the quenching furnace. Thereafter, the base material is descaled by completely removing the scale layer formed on the surface thereof, and subsequently quenched. In this case, a scale layer consisting of an inner layer scale and an outer layer scale is formed on the surface of the base material due to the heating. In this treatment, when the heating temperature is less than 850° C., austenitic single layer cannot be formed in the base material.

Moreover, it is difficult to completely remove the scale layer in the descaling treatment. When, for instance, the descaling is carried out using a high-pressure water descaler, not only mechanical descaling with the aid of the water pressure is carried out, but also descaling with the aid of a difference in the thermal expansion coefficient between the base material and the scale layer is carried out.

At a decreased heating temperature, the descaling with the aid of the difference in the thermal expansion coefficient is ineffective, so that it is difficult to completely descale the scale layer. On the other hand, a heating temperature of more than 980° C. causes the brittleness of the base material to be reduced.

So long as the scale layer may be completely removed, any method can be employed for descaling the scale layer. For the following reasons, the scale layer has to be completely removed: A scale layer is also formed in the quenching treatment described in (b), so that, if part of the scale layer remains in the quenching treatment, there exists a mixture of both the scale layer formed in the heating of the quenching treatment and the scale layer formed in the tempering treatment.

In this case, the state of the mixed scale layers depends on the amount of the scale layer formed in the heating of the quenching treatment, and therefore it is difficult to adjust the amount of the scale layer to be removed, thereby making it difficult to obtain a desired scale layer. The above-mentioned method using a high-pressure water scaler can be employed as a descaling method.

Figure 2:
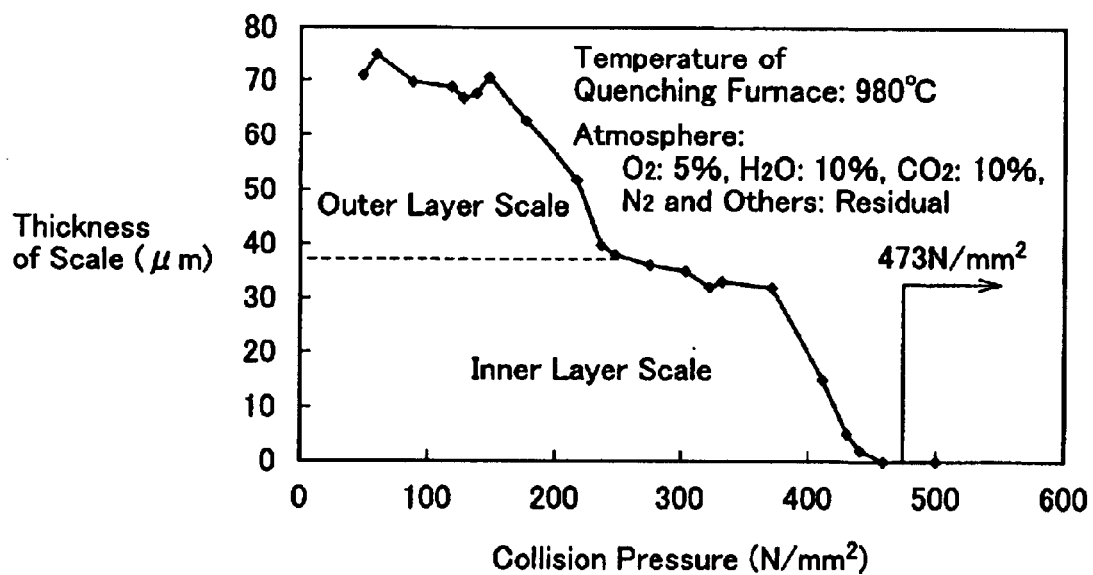
FIG. 2 is a diagram showing the relationship between the collision pressure of the high-pressure water and the thickness of the scale layer, when the scale layer formed in the heating of the quenching treatment is removed with a high-pressure water descaler.

FIG. 2 is a diagram showing the relationship between the collision pressure and the thickness of the scale layer, when the scale layer formed in the heating of the quenching treatment is removed with a high-pressure water descaler. In this case, the collision pressure means the pressure of the high-pressure water applied to a unit area of the scale layer. From FIG. 2, it can be recognized that a collision pressure of not less than 473 N/mm² is required to completely remove the scale layer with the high-pressure water descaler.

After descaling, the steel material is quenched, and a conventional quenching method may be employed. The quenching is capable of providing a martensitic transformation in the base material.

(b) Tempering

In the tempering treatment, a tempering furnace is filled with a gas atmosphere similar to that in the quenching treatment. The component of the gas atmosphere is the same as described above. The tempering treatment provides the formation of a new scale layer consisting of an inner layer scale and an outer layer scale. In the descaling, part of the new scale layer is removed.

The descaling is carried out in such a manner that the inner layer scale having high weather resistance remains, and that the outer layer scale covers the surface of the inner layer scale at a surface coverage of 1–15% and the thickness of the outer layer scale is not more than 20 m. The decaling method using a high-pressure water descaler is employed.

Figure 3:
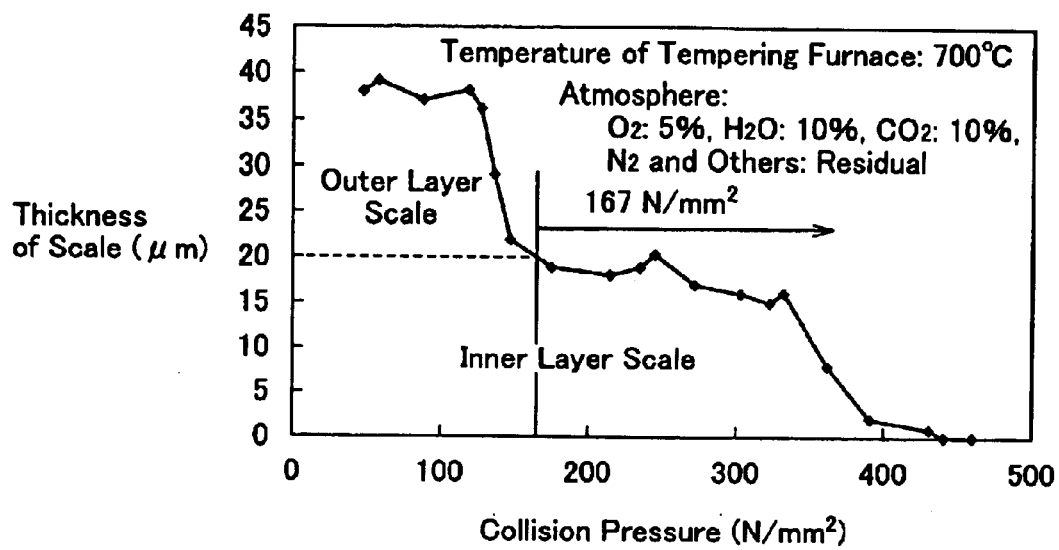
FIG. 3 is a diagram showing the relationship between the collision pressure of the high-pressure water and the thickness of the scale layer, when the scale layer formed in the heating of the tempering treatment is removed with a high-pressure water descaler.

FIG. 3 is a diagram showing the relationship between the collision pressure and the thickness of the scale layer, when the scale layer formed in the tempering treatment is removed with a high-pressure water descaler.

Figure 4:
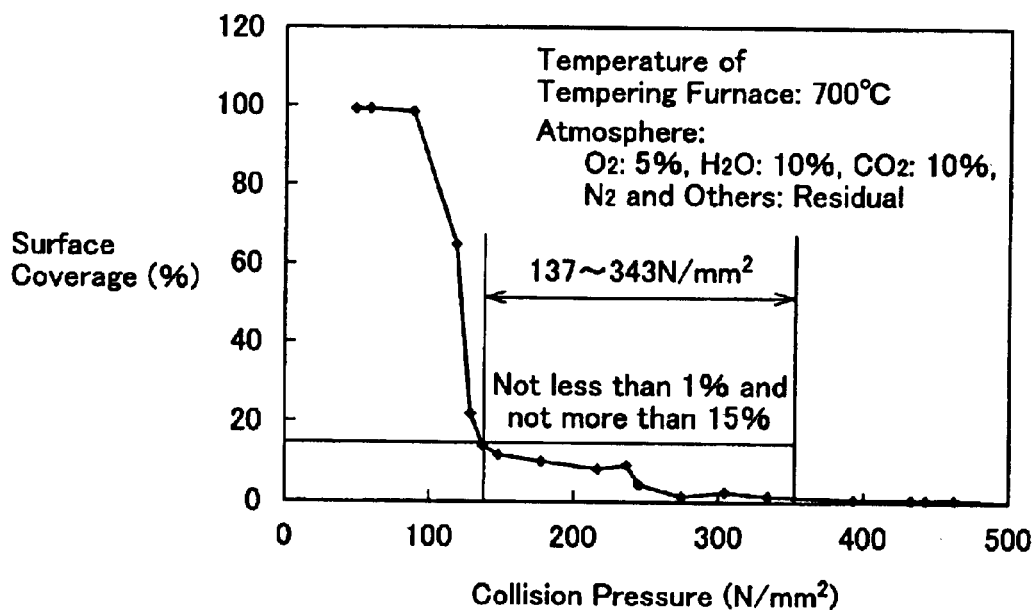
FIG. 4 is a diagram showing the relationship between the collision pressure of the high-pressure water and the surface coverage of the outer layer scale, when the scale layer formed in the tempering treatment is removed with a high-pressure water descaler.

Moreover, FIG. 4 is a diagram showing the relationship between the collision pressure and the surface coverage, when the scale layer formed in the tempering treatment is removed with a high-pressure water descaler.

From both diagrams, it can be recognized that a collision pressure of 167–343 N/mm² is required to obtain the outer layer scale having a surface coverage of 1–15% and a thickness of the outer layer scale of not more than 20 $\mu$m, when the scale formed in the tempering treatment is removed with the high-pressure water descaler.

As described above, the application of the rust preventive oil to the scale layer provides a martensitic stainless steel having high weather resistance.

Embodiment

In order to confirm the effect obtainable from the present invention, martensitic stainless steels having a varied scale layer were prepared and the state of red rust formed in the weathering test was investigated. As test pieces, seamless steel pipes having an outside diameter of 88.9 mm and a thickness of 6.44 mm were used. In this case, the chemical component of the test pieces was as follows: C: 0.19%, Si: 0.24%, Mn: 0.78%, Cr: 12.7%, Ni: 0.12%, Al: 0.003%, N: 0.029%, S: 0.001% and P: 0.015%.

In order to form a scale layer on the surface of the test piece, the test piece was firstly heated in a quenching furnace at 970° C. under a gas atmosphere of $O_2$: 5%, $H_2O$: 10%, $CO_2$: 10%, $N_2$ and others: residual, and before the air quenching, high-pressure water was applied to the test piece at a collision pressure of 473 N/mm² with a high-pressure descaler to completely remove the scale layer.

Thereafter, the test piece thus air quenched was tempered at 700° C. for 30 min in a tempering furnace under the same atmosphere as that in the quenching furnace, and then the scale layer newly formed was again descaled with a high-pressure water descaler. In this case, the state of the scale layer was varied by changing both the pressure of water supplied from the high-pressure water descaler and the distance between the test piece and the descaler.

Utilizing both an electron probe micro analyzer (EPMA) and a scanning electron microscope (SEM), the state of scale was observed at 12 portions each having an area of 1 mm² on the outer surface of a tubular test piece, in which case, 4 portions are circumferentially located with the same angular spacing of 90 degrees, departing from each other, at each of three different axial positions, i.e., the two axial positions being located at 200 mm from the end of the test piece; and the other axial position being located at the center thereof.

In this observation, a portion exhibiting Cr image was regarded as an area of the inner layer scale and a portion exhibiting no Cr image, i.e., including Fe and O, was regarded as an area of the outer layer scale, and thereby the surface coverage was determined by averaging the observed areas over the 12 areas of each test piece.

Two test pieces having the same state of the scale layer were prepared as for each of the states: In one test piece, as rust preventive oil, linseed oil is applied on the surface thereof, and the other test piece no linseed oil is applied on the surface thereof. A simulation test of shipment and transportation was carried out for both test pieces, in which case, a mechanical vibration having an amplitude of 10 mm and a cycle of 60 times per min was applied for one hour to these specimens, and further a weathering test was carried out under an environment at 50° C. and at a humidity of 98% for a week after an aqueous solution of artificial seawater diluted one hundred times by water was applied to the surface of the test pieces, and then the state of the red rust generated was investigated.

In the investigation of red rust generating state, an intensity histogram was determined for each of three primary colors, i.e., red, blue and green, from the test piece image stored in a computer. On the basis of these intensity histograms, characteristic values were calculated from parameters such as pixel density, peak value and the like which represented the characteristics of the image. The surface quality of the test pieces was determined by comparing the characteristic values with predetermined threshold values. The surface rate of the red rust was calculated from the determined results.

The state of scale layer and the state of generated red rust are listed in Table 1.

TABLE 1

| Test Piece No. | Scale State Outer Layer Scale | | State of Forming Red Rust Red Rust Surface Ratio (%) | |
|---|---|---|---|---|
| | Surface coverage (%) | Thickness ($\mu$m) | With Rust Preventive Oil | Without Rust Preventive Oil |
| 1 | 100 | 12 | 14 | 30 |
| 2 | 100 | 25 | 34 | 32 |
| 3 | 95 | 30 | 32 | 33 |
| 4 | 90 | 18 | 18 | 34 |
| 5 | 80 | 16 | 17 | 32 |
| 6 | 70 | 22 | 24 | 29 |
| 7 | 65 | 15 | 14 | 32 |
| 8 | 60 | 16 | 18 | 31 |
| 9 | 50 | 28 | 20 | 32 |
| 10 | 45 | 13 | 14 | 28 |
| 11 | 40 | 16 | 13 | 27 |
| 12 | 30 | 22 | 18 | 31 |
| 13 | 25 | 16 | 12 | 32 |
| 14 | 20 | 18 | 7 | 30 |
| 15 | 15 | 17 | 0 | 27 |
| 16 | 10 | 12 | 0 | 29 |
| 17 | 5 | 14 | 0 | 28 |
| 18 | 3 | 17 | 0 | 25 |
| 19 | 2 | 13 | 0 | 31 |
| 20 | 1 | 14 | 0 | 32 |
| 21 | 25 | 24 | 21 | 28 |
| 22 | 20 | 22 | 25 | 26 |
| 23 | 16 | 26 | 21 | 32 |
| 24 | 10 | 28 | 18 | 28 |
| 25 | 5 | 24 | 15 | 27 |
| 26 | 4 | 29 | 10 | 27 |
| 27 | 2 | 30 | 7 | 31 |

Red rust was formed for all the test pieces having no rust preventive oil on the surface. As for the test pieces having rust preventive oil on the surface, the red rust appeared at a surface coverage of more than 15%(No. 1–4, and 21–23), even if the thickness of the outer layer scale was decreased. Similarly, the red rust appeared for test pieces having a surface coverage of not more than 15%(No. 15–20, and 24–27) and a scale thickness of more than 20 $\mu$m (No. 24–27). These facts result from the fact that the outer layer scale and the rust preventive oil are both removed from the surface due to the vibration of the test piece.

From the results in Table 1, it can be recognized that a martensitic stainless steel having a high weather resistance can be obtained when the surface coverage is not more than 15% and, at the same time, the thickness of the outer scale is not more than 20 $\mu$m.

Industrial Applicability

In the martensitic stainless steel and the manufacturing method thereof according to the present invention, the steel composition is restricted within a specific range for each element. The scale layer formed on the surface of the base material consists of an inner layer scale mainly including $FeCr_2O_4$ and an outer layer scale having a thickness of not more than 20 $\mu$m, which outer layer is deposited on the inner layer scale at a surface coverage of 1%–15%. The application of rust preventive oil onto the surface of the steel ensures an excellent weather resistance during a long term, and therefore a martensitic stainless steel forming no rust either in the outdoor depository or in the indoor depository can be provided. The steel can be used to manufacture, not only steel pipes, but also steel plates, steel rods and others in a wide application field.

What is claimed is:

1. A martensitic stainless steel comprising:

in mass % C: 0.15–0.22%, Si: 0.18–1.0%, Mn: 0.05–1.0%, Cr: 10.5–14.0% and Fe as substantial residual, and further including Ni: not more than 0.20%, Al: not more than 0.05%, N: not more than 0.100%, S: not more than 0.015% and P: not more than 0.020% as impurities;

wherein a scale layer on the surface of the base material consists of an inner layer scale including mainly $FeCr_2O_4$, and an outer layer scale having a thickness of not more than 20 $\mu$m deposited on the surface of the inner layer scale at a surface coverage of not less than 1% and not more than 15%; and wherein rust preventive oil is applied to the surface of said scale layer.

2. A method for manufacturing a martensitic stainless steel, comprising the steps of:

heating a base material comprising in mass % C: 0.15–0.22%, Si: 0.18–1.0%, Mn: 0.05–1.0%, Cr: 10.5–14.0% and Fe as substantial residual, and further including Ni: not more than 0.20%, Al: not more than 0.05%, N: not more than 0.100%, S: not more than 0.015% and P: not more than 0.020% as impurities in a quenching furnace at 850–980° C.;

completely descaling a scale layer formed on the surface of the base material;

quenching the base material;

tempering the base material in a tempering furnace;

partially descaling a scale layer newly formed on the surface of the base material to form a finished scale layer consisting of an inner layer scale including mainly $FeCr_2O_4$ and an outer layer scale having a thickness of not more than 20 $\mu$m deposited on the surface of the inner layer scale at a surface coverage of not less than 1% and not more than 15%; and applying rust preventive oil.

3. A method for manufacturing a martensitic stainless steel according to claim 2, wherein the descaling after heating in the quenching furnace is carried out at a collision pressure of not less than 473 N/mm$^2$ using a high-pressure water descaler.

4. A method for manufacturing a martensitic stainless steel according to claim 2, wherein the descaling after the tempering is carried out at a collision pressure of 167–343 N/mm$^2$ using a high-pressure water descaler.

5. A method for manufacturing a martensitic stainless steel according to claim 2, wherein the descaling after heating in the quenching furnace is carried out at a collision pressure of not less than 473 N/mm$^2$ using a high-pressure water descaler, and wherein the descaling after the tempering is carried out at a collision pressure of 167–343 N/mm$^2$ using a high-pressure water descaler.

* * * * *